(12) United States Patent
Arsenault

(10) Patent No.: US 8,694,581 B2
(45) Date of Patent: Apr. 8, 2014

(54) MODIFYING BROWSER REQUESTS TO TRACK BROWSING ACTIVITIES

(75) Inventor: David Arsenault, Reston, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/614,201

(22) Filed: Sep. 13, 2012

(65) Prior Publication Data

US 2013/0173694 A1     Jul. 4, 2013

Related U.S. Application Data

(63) Continuation of application No. 13/191,844, filed on Jul. 27, 2011, now Pat. No. 8,539,023, which is a continuation of application No. 12/172,703, filed on Jul. 14, 2008, now Pat. No. 7,996,460, which is a continuation of application No. 09/693,840, filed on Oct. 23, 2000, now Pat. No. 7,401,115.

(60) Provisional application No. 60/160,874, filed on Oct. 22, 1999.

(51) Int. Cl.
*G06F 15/16*     (2006.01)

(52) U.S. Cl.
USPC ............................ 709/203; 709/223; 709/224

(58) Field of Classification Search
USPC .......................................... 709/203, 223–224
See application file for complete search history.

(56) References Cited

U.S. PATENT DOCUMENTS

| | | | |
|---|---|---|---|
| 4,238,853 A | 12/1980 | Ehrsam et al. | |
| 4,578,530 A | 3/1986 | Zeidler | |
| 5,245,656 A | 9/1993 | Loeb et al. | |
| 5,586,260 A | 12/1996 | Hu | |
| 5,590,197 A | 12/1996 | Chen et al. | |
| 5,671,279 A | 9/1997 | Elgamal | |
| 5,673,322 A | 9/1997 | Pepe et al. | |
| 5,678,041 A | 10/1997 | Baker et al. | |
| 5,708,780 A | 1/1998 | Levergood et al. | |
| 5,740,252 A | 4/1998 | Minor et al. | |
| 5,740,361 A | 4/1998 | Brown | |
| 5,757,925 A | 5/1998 | Faybishenko | |
| 5,764,890 A | 6/1998 | Glasser et al. | |
| 5,802,320 A | 9/1998 | Baehr et al. | |

(Continued)

FOREIGN PATENT DOCUMENTS

| | | |
|---|---|---|
| EP | 0848338 | 6/1998 |
| EP | 0855659 | 7/1998 |

(Continued)

OTHER PUBLICATIONS

U.S. Appl. No. 13/191,844, filed Jul. 21, 2011, Arsenault.

(Continued)

*Primary Examiner* — Alina N Boutah
(74) *Attorney, Agent, or Firm* — Keller Jolley Preece

(57) ABSTRACT

Processing a browser request that specifies a destination network resource generally includes intercepting a browser request that specifies a selected destination network resource and redirecting the browser request to a network server that differs from the destination resource specified by the browser request. Processing a browser request also may include intercepting a browser request received from a client computer at a proxy server when the browser request specifies a selected destination network resource and performing instructions associated with and in addition to instructions performed to download the selected destination network resource.

19 Claims, 11 Drawing Sheets

(56) References Cited

U.S. PATENT DOCUMENTS

| | | | |
|---|---|---|---|
| 5,805,803 A | 9/1998 | Birrell et al. | |
| 5,812,769 A | 9/1998 | Graber et al. | |
| 5,815,665 A | 9/1998 | Teper et al. | |
| 5,818,446 A | 10/1998 | Bertram et al. | |
| 5,825,890 A | 10/1998 | Elgamal et al. | |
| 5,826,025 A | 10/1998 | Gramlich | |
| 5,826,242 A | 10/1998 | Montulli | |
| 5,845,070 A | 12/1998 | Ikudome | |
| 5,845,300 A | 12/1998 | Comer et al. | |
| 5,848,396 A | 12/1998 | Gerace | |
| 5,855,008 A | 12/1998 | Goldhaber et al. | |
| 5,889,956 A | 3/1999 | Hauser et al. | |
| 5,892,761 A | 4/1999 | Stracke, Jr. | |
| 5,905,872 A | 5/1999 | DeSimone et al. | |
| 5,933,827 A | 8/1999 | Cole et al. | |
| 5,941,954 A | 8/1999 | Kalajan | |
| 5,960,411 A | 9/1999 | Hartman et al. | |
| 5,961,593 A | 10/1999 | Gabber et al. | |
| 5,974,398 A | 10/1999 | Hanson et al. | |
| 5,978,799 A | 11/1999 | Hirsch | |
| 5,987,454 A | 11/1999 | Hobbs | |
| 5,991,735 A | 11/1999 | Gerace | |
| 5,991,795 A | 11/1999 | Howard et al. | |
| 5,991,810 A | 11/1999 | Shapiro et al. | |
| 6,029,175 A | 2/2000 | Chow et al. | |
| 6,038,598 A | 3/2000 | Danneels | |
| 6,041,357 A * | 3/2000 | Kunzelman et al. | 709/228 |
| 6,047,376 A | 4/2000 | Hosoe | |
| 6,049,821 A | 4/2000 | Theriault et al. | |
| 6,049,877 A | 4/2000 | White | |
| 6,052,785 A | 4/2000 | Lin et al. | |
| 6,073,175 A | 6/2000 | Tavs et al. | |
| 6,081,900 A | 6/2000 | Subramaniam et al. | |
| 6,092,053 A | 7/2000 | Boesch et al. | |
| 6,092,196 A | 7/2000 | Reiche | |
| 6,092,204 A | 7/2000 | Baker | |
| 6,105,027 A | 8/2000 | Schneider et al. | |
| 6,112,212 A | 8/2000 | Heitler | |
| 6,112,227 A | 8/2000 | Heiner | |
| 6,119,098 A | 9/2000 | Guyot et al. | |
| 6,128,627 A | 10/2000 | Mattis et al. | |
| 6,128,663 A | 10/2000 | Thomas | |
| 6,131,095 A | 10/2000 | Low et al. | |
| 6,138,162 A | 10/2000 | Pistriotto et al. | |
| 6,141,010 A * | 10/2000 | Hoyle | 715/854 |
| 6,144,996 A | 11/2000 | Starnes et al. | |
| 6,151,686 A | 11/2000 | McDonough et al. | |
| 6,161,145 A | 12/2000 | Bainbridge et al. | |
| 6,178,411 B1 | 1/2001 | Reiter | |
| 6,178,441 B1 | 1/2001 | Elnozahy | |
| 6,182,141 B1 | 1/2001 | Blum et al. | |
| 6,195,681 B1 | 2/2001 | Appleman et al. | |
| 6,212,563 B1 | 4/2001 | Beser | |
| 6,212,640 B1 | 4/2001 | Abdelnur et al. | |
| 6,223,215 B1 | 4/2001 | Hunt et al. | |
| 6,226,752 B1 | 5/2001 | Gupta et al. | |
| 6,243,864 B1 | 6/2001 | Odani et al. | |
| 6,253,202 B1 | 6/2001 | Gilmour | |
| 6,253,326 B1 | 6/2001 | Lincke et al. | |
| 6,272,492 B1 | 8/2001 | Kay | |
| 6,272,631 B1 | 8/2001 | Thomlinson et al. | |
| 6,286,043 B1 | 9/2001 | Cuomo et al. | |
| 6,286,046 B1 | 9/2001 | Bryant | |
| 6,289,462 B1 | 9/2001 | McNabb et al. | |
| 6,298,380 B1 | 10/2001 | Coile et al. | |
| 6,308,216 B1 | 10/2001 | Goldszmidt et al. | |
| 6,314,565 B1 | 11/2001 | Kenner et al. | |
| 6,321,336 B1 | 11/2001 | Applegate et al. | |
| 6,324,585 B1 | 11/2001 | Zhang et al. | |
| 6,330,561 B1 | 12/2001 | Cohen et al. | |
| 6,330,588 B1 | 12/2001 | Freeman | |
| 6,357,010 B1 | 3/2002 | Viets et al. | |
| 6,360,270 B1 | 3/2002 | Cherkasova et al. | |
| 6,373,950 B1 | 4/2002 | Rowney | |
| 6,385,592 B1 | 5/2002 | Angles et al. | |
| 6,389,460 B1 | 5/2002 | Stewart et al. | |
| 6,389,462 B1 | 5/2002 | Cohen et al. | |
| 6,393,407 B1 | 5/2002 | Middleton et al. | |
| 6,415,322 B1 | 7/2002 | Jaye | |
| 6,418,471 B1 * | 7/2002 | Shelton et al. | 709/227 |
| 6,421,781 B1 | 7/2002 | Fox et al. | |
| 6,434,608 B1 | 8/2002 | Desai | |
| 6,438,125 B1 * | 8/2002 | Brothers | 370/352 |
| 6,438,592 B1 * | 8/2002 | Killian | 709/224 |
| 6,438,652 B1 | 8/2002 | Jordan et al. | |
| 6,460,081 B1 | 10/2002 | Doherty et al. | |
| 6,460,141 B1 | 10/2002 | Olden | |
| 6,466,970 B1 | 10/2002 | Lee et al. | |
| 6,487,538 B1 | 11/2002 | Gupta et al. | |
| 6,487,592 B1 | 11/2002 | Sawyer et al. | |
| 6,490,602 B1 | 12/2002 | Kraemer | |
| 6,516,000 B1 | 2/2003 | Kshirsagar et al. | |
| 6,532,493 B1 | 3/2003 | Aviani et al. | |
| 6,564,243 B1 | 5/2003 | Yedidia et al. | |
| 6,571,295 B1 * | 5/2003 | Sidana | 709/246 |
| 6,587,836 B1 | 7/2003 | Ahlberg et al. | |
| 6,606,643 B1 | 8/2003 | Emens et al. | |
| 6,606,657 B1 | 8/2003 | Zilberstein et al. | |
| 6,606,663 B1 | 8/2003 | Liao et al. | |
| 6,606,708 B1 | 8/2003 | Devine et al. | |
| 6,640,242 B1 | 10/2003 | O'Neal et al. | |
| 6,651,095 B2 | 11/2003 | Barlock et al. | |
| 6,687,732 B1 * | 2/2004 | Bector et al. | 709/200 |
| 6,687,746 B1 | 2/2004 | Shuster et al. | |
| 6,718,390 B1 | 4/2004 | Still et al. | |
| 6,735,631 B1 | 5/2004 | Oehrke et al. | |
| 6,760,746 B1 | 7/2004 | Schneider | |
| 6,766,454 B1 | 7/2004 | Riggins | |
| 6,769,019 B2 | 7/2004 | Ferguson | |
| 6,775,687 B1 | 8/2004 | Binding et al. | |
| 6,944,669 B1 | 9/2005 | Saccocio | |
| 7,103,018 B1 | 9/2006 | Hansen et al. | |
| 7,130,885 B2 | 10/2006 | Chandra et al. | |
| 7,146,505 B1 | 12/2006 | Harada et al. | |
| 7,225,249 B1 | 5/2007 | Barry et al. | |
| 7,272,639 B1 * | 9/2007 | Levergood et al. | 709/218 |
| 7,275,086 B1 * | 9/2007 | Bodnar | 709/218 |
| 7,343,351 B1 | 3/2008 | Bishop et al. | |
| 7,401,115 B1 | 7/2008 | Arsenault | |
| 7,895,446 B2 | 2/2011 | Harada et al. | |
| 7,966,259 B1 | 6/2011 | Bui | |
| 7,996,460 B1 | 8/2011 | Arsenault | |
| 8,539,023 B2 | 9/2013 | Arsenault | |
| 2001/0023436 A1 | 9/2001 | Srinivasan et al. | |
| 2001/0039587 A1 | 11/2001 | Uhler et al. | |
| 2001/0047484 A1 | 11/2001 | Medvinsky et al. | |
| 2002/0052935 A1 | 5/2002 | Paxhia et al. | |
| 2002/0059402 A1 | 5/2002 | Belanger | |
| 2002/0087559 A1 | 7/2002 | Pratt | |
| 2003/0009430 A1 | 1/2003 | Burkey et al. | |
| 2003/0036974 A1 | 2/2003 | Allen | |
| 2005/0240992 A1 | 10/2005 | Coley et al. | |
| 2006/0047847 A1 | 3/2006 | Saccocio | |
| 2008/0201344 A1 | 8/2008 | Levergood et al. | |
| 2011/0145590 A1 | 6/2011 | Harada et al. | |
| 2011/0282927 A1 * | 11/2011 | Arsenault | 709/201 |
| 2013/0073693 A1 | 3/2013 | Harada et al. | |
| 2013/0073861 A1 | 3/2013 | Harada et al. | |
| 2013/0073862 A1 | 3/2013 | Harada et al. | |
| 2013/0173693 A1 * | 7/2013 | Arsenault | 709/203 |
| 2013/0173694 A1 * | 7/2013 | Arsenault | 709/203 |
| 2013/0173695 A1 * | 7/2013 | Arsenault | 709/203 |
| 2013/0179677 A1 | 7/2013 | Harada et al. | |
| 2013/0191905 A1 | 7/2013 | Harada et al. | |

FOREIGN PATENT DOCUMENTS

| | | |
|---|---|---|
| EP | 0893920 | 1/1999 |
| JP | 9-114783 | 5/1989 |
| JP | 11-31126 | 5/1997 |
| WO | WO 97/15885 | 5/1997 |
| WO | WO 98/31155 | 7/1998 |
| WO | WO 98/33130 | 7/1998 |
| WO | WO 98/36522 | 8/1998 |

(56) References Cited

FOREIGN PATENT DOCUMENTS

| WO | WO 98/43150 | 10/1998 |
|---|---|---|
| WO | WO 98/45793 | 10/1998 |
| WO | WO 98/58334 | 12/1998 |
| WO | WO 99/00958 | 1/1999 |
| WO | WO 99/00960 | 1/1999 |
| WO | WO 99/03243 | 1/1999 |
| WO | WO 00/79432 | 12/2000 |
| WO | 01/43033 | 6/2001 |

OTHER PUBLICATIONS

U.S. Appl. No. 13/613,892, filed Sep. 13, 2012, Arsenault.
U.S. Appl. No. 13/614,225, filed Sep. 13, 2012, Arsenault.
Office Action dated Feb. 24, 2004 for U.S. Appl. No. 09/323,415.
Notice of Allowance issued in U.S. Appl. No. 09/693,840 mailed Mar. 11, 2008, 7 pages.
Office Action issued in U.S. Appl. No. 09/693,840 mailed May 28, 2004, 17 pages.
Office Action issued in U.S. Appl. No. 09/693,840 mailed Dec. 5, 2003, 16 pages.
Office Action issued Aug. 19, 2008 in U.S. Appl. No. 11/223,121, 37 pages.
Office Action issued Mar. 14, 2012 in U.S. Appl. No. 13/191,844.
Office Action issued Sep. 28, 2011 in U.S. Appl. No. 13/191,844.
Notice of Allowance issued in U.S. Appl. No. 13/191,844 mailed Oct. 1, 2012, 5 pages.
U.S. Appl. No. 13/614,201, May 31, 2013, Office Action.
Gabber et al., "How to Make Personalized Web Browsing Simple, Secure, and Anonymous," Financial Cryptography, International Conference, Feb. 24, 1997 (XP002059819), pp. 17-31.
Petitcolas et al., "WebGroup: a secure group access control tool for the World-Wide Web," Proceedings—the Workshop on Enabling Technologies: Infrastructure for Collaborative Enterprises, US, IEEE Computer Society Press, Los Alamitos, CA, 1998 (XP002142486), pp. 301-305.
U.S. Appl. No. 09/258,242, filed Feb. 26, 1999.
Wu et al., Virtual Proxy Servers for WWW and Intelligent Agents on the Internet, 1997 IEEEΩ.
R. Collier, Canadian Office Action, Application No. 2,363,571, Jan. 15, 2004, 3 pages.
"Sixth International World Wide Web Conference" Conference Proceedings, http://decweb.ethz.ch/WWW6/. Apr. 7-11, 1997.
"Extranet Security: What's Right for the Business?", Steve Trulan, p. 47, Information Systems Security, vol. 7, No. 1, Spring 1998.
"Exploiting User Behavior in Prefetching WWW Documents", El Saddik et al., pp. 302-311, Interactive Distributed Multimedia Systems and Telecommunications Services, 5th International Workshop 1998.
"Intercessory Objects within Channels" Barry Kitson, Telecom Research Laboratories, 1995.
"Webgroup: a secure group access control tool for the World-Wide Web", Petitcolas and Zhang pp. 301-305, Proceedings of Seventh IEEE International Workshops on Enabling Technologies: Infrastructure for Collaborative Enterprises, 1988.
"Notice of Reasons for Rejection," Japanese Patent Application No. 2000-601562, Jul. 8, 2004.
"Statement of Grounds of Opposition," Austrailian Patent Application No. 200035010 (769163), Jul. 15, 2004.
Japanese Office Action issued on Nov. 29, 2005 for JP 2001-500930, 3 pages. Translation of the Japanese Office Action, 2 pages.
Kamiba et al., "User Profile Management Agent", Information Processing Institute Study Report (97-H1-70), vol. 97, No. 2, Jan. 16, 1997, p. 1-8. Partial translation of publication, 3 pages.
"Recent Application Server Situations", ASCII NT, vol. 4, No. 3, Mar. 1, 1999, pp. 225-229. Partial translation of publication, 2 pages.
International Search Report issued in WO 00/73876 on Jan. 29, 2001.
U.S. Appl. No. 09/258,242, Apr. 1, 2003, Office Action.
U.S. Appl. No. 09/323,415, Aug. 12, 2002, Office Action.
U.S. Appl. No. 09/323,415, Sep. 17, 2003, Office Action.
U.S. Appl. No. 09/323,415, Sep. 3, 2004, Office Action.
U.S. Appl. No. 09/323,415, Mar. 23, 2005, Notice of Allowance.
U.S. Appl. No. 09/323,415, Mar. 7, 2006, Notice of Allowance.
U.S. Appl. No. 09/693,860, Dec. 19, 2003, Office Action.
U.S. Appl. No. 09/693,860, Jul. 1, 2004, Office Action.
U.S. Appl. No. 09/693,860, Feb. 9, 2005, Notice of Allowance.
U.S. Appl. No. 09/693,860, May 3, 2005, Notice of Allowance.
U.S. Appl. No. 11/223,121, Feb. 2, 2009, Office Action.
U.S. Appl. No. 11/535,056, Jun. 23, 2008, Office Action.
U.S. Appl. No. 11/535,056, Feb. 26, 2009, Office Action.
U.S. Appl. No. 11/535,056, Feb. 22, 2010, Office Action.
U.S. Appl. No. 11/535,056, Jun. 24, 2010, Office Action.
U.S. Appl. No. 11/535,056, Oct. 18, 2010, Notice of Allowance.
U.S. Appl. No. 12/172,703, Apr. 28, 2010, Office Action.
U.S. Appl. No. 12/172,703, Oct. 15, 2010, Office Action.
U.S. Appl. No. 12/172,703, Mar. 30, 2011, Notice of Allowance.
U.S. Appl. No. 13/030,986, Feb. 16, 2012, Office Action.
U.S. Appl. No. 13/030,986, Aug. 1, 2012, Office Action.
U.S. Appl. No. 13/030,986, Nov. 27, 2012, Office Action.
U.S. Appl. No. 13/030,986, Apr. 12, 2013, Office Action.
U.S. Appl. No. 13/191,844, May 24, 2013, Notice of Allowance.
U.S. Appl. No. 13/613,892, Jul. 8, 2013, Office Action.
U.S. Appl. No. 13/614,225, Jul. 22, 2013, Office Action.
U.S. Appl. No. 13/616,516, Jun. 27, 2013, Office Action.
U.S. Appl. No. 13/616,540, Jun. 26, 2013, Office Action.
U.S. Appl. No. 13/616,620, Mar. 20, 2013, Office Action.
U.S. Appl. No. 13/616,620, Oct. 2, 2013, Notice of Allowance.
U.S. Appl. No. 13/613,892, Dec. 10, 2013, Notice of Allowance.
U.S. Appl. No. 13/614,225, Dec. 10, 2013, Notice of Allowance.
U.S. Appl. No. 13/030,986, Dec. 18, 2013, Notice of Allowance.
U.S. Appl. No. 13/616,516, Dec. 23, 2013, Notice of Allowance.

\* cited by examiner

Trap List Used To Filter Browser Requests

\# Shopping Toolbar / Jump Server Domains
\# This file tells the proxy what domains (both www.gap.com and
\# gap.com formats) to "trap" and send to the Jump (toolbar) Servers.

www.1800flowers.com URL   0x0 0
/ 0x00011000 0x0

1800flowers.com URL   0x0 0
/ 0x00011000 0x0 www.800.com URL    0x0 0
/ 0x00011000 0x0

Instruction List Associating Filtered Domains With Desired Content or Processing

150a ns_jump_add url http://sportsmansguide.com/ {URL http://sportsmansguide.com/} {{ADP file} frameset.adp} {{Real URL} http://sportsmansguide.com/?} {Enabled t} {title "Sportman's Guide"} ns_jump_add url http://www.sportsmansguide.com/ {URL http://www.sportsmansguide.com/} {{ADP file} frameset.adp} {{Real URL}http://www.sportsmansguide.com/?} {Enabled t} {title "Sportman's Guide"} ns_jump_add url http://storybookheirlooms.com/ {URL http://storybookheirlooms.com/} {{ADP file} frameset.adp} {{Real URL} http://storybookheirlooms.com/?} {Enabled t} {title "Storybook Beirlooms"} ns_jump_add url http://www.storybookheirlooms.com/ {URL http://www.storybookheirlooms.com/} {{ADP file} frameset.adp} {{Real URL} http://www.storybookheirlooms.com/?} {Enabled t} {title "Storybook Beirlooms"} ns_jump_add url http://surplusauction.com/ {URL http://surplusauction.com/} {{ADP file} frameset.adp} {{Real URL} http://surplusauction.com/?} {Enabled t} {title "Surplus Auctions"}

FIG. 1C

MODIFYING BROWSER REQUESTS TO TRACK BROWSING ACTIVITIES

CROSS REFERENCE TO RELATED APPLICATIONS

This application is a continuation of U.S. application Ser. No. 13/191,844, filed on Jul. 27, 2011, which is a continuation of U.S. application Ser. No. 12/172,703, filed on Jul. 14, 2008, which is a continuation application of and claims priority to U.S. application Ser. No. 09/693,840, filed on Oct. 23, 2000, now allowed and will issue on Jul. 15, 2008 as U.S. Pat. No. 7,401,115, which claims priority to U.S. Provisional Application Ser. No. 60/160,874, filed Oct. 22, 1999, all of which are incorporated by reference herein in their entirety.

TECHNICAL FIELD

The present disclosure generally relates to processing selected browser requests.

BACKGROUND

Internet use has become increasingly pervasive in recent years. Resources available on the Internet include electronic content and services. Internet resources may be accessed using a browser and an Internet service provider (ISP). An ISP includes a computer or group of computers that enable a physical connection between the Internet and the computer of a person seeking access to the Internet ("client computer"). A browser is a software tool installed on the client computer and designed to enable communications over the physical connection established by the ISP. In this manner, the browser and ISP may be used together to allow communications between the client computer and other computers that are connected to the Internet.

More specifically, a web browser is a program that enables requests to be made of web servers connected to the Internet using a Hypertext Transfer Protocol (HTTP), an application layer protocol for exchanging files on the World Wide Web (www) that is defined in Internet standard RFC 2068. The browser displays web pages provided in response to these requests. A browser may also be used for displaying documents described using the Hypertext Markup Language (HTML).

A single web page may be composed of several different files potentially of different data types (for example, text, graphics, images, virtual worlds, sounds, and movies). In addition, a web page can include links pointing to other resources available on the network (for example, web pages or individual files). Links can be displayed as text strings, as graphical images, or as combinations of the two. Each link has a network address or uniform resource locator (URL), which is essentially a pointer to network resources that is defined by Internet standard RFC 1738.

When a user clicks on or otherwise selects a displayed link, the browser automatically retrieves the web page (or other resource) corresponding to the link's associated URL and displays or executes that link. A computer operator may also access desired Internet resources using browser requests that typically include a domain name corresponding to one or more destination servers storing desired Internet resources, e.g., www.jcrew.com or www.dell.com. Browser requests may also include the URL of specific web pages stored on those destination servers, e.g., www.jcrew.com/homepage-.html. In either case, a browser request may be satisfied by mapping a specified domain name or URL to a corresponding destination server.

SUMMARY

In one aspect, generally, processing a browser request that specifies a destination network resource generally includes intercepting a browser request that specifies a selected destination network resource and redirecting the browser request to a network server that differs from the destination resource specified by the browser request.

Implementations may include one or more of the following features. For example, the intercepting may include routing the browser request to a proxy server including a list of selected network resources, comparing the browser request to the list of selected network resources, and intercepting the browser request when the browser request includes one or more of the selected network resources that are specified by the list. The redirecting may include comparing the browser request to a list that includes instructions associated with the destination resource and performing the instructions associated with the destination resource. Performing the instructions may include displaying content that differs from the destination resource; adding content to the destination resource and displaying the destination resource that includes the added content; and displaying content from the destination resource from a network server that differs from the destination resource.

In another general aspect, processing a browser request also may include intercepting a browser request received from a client computer at a proxy server when the browser request specifies a selected destination network resource and performing instructions associated with, and in addition to, instructions performed to download the selected destination network resource.

Other features and advantages will be apparent from the description, including the drawings, and from the claims.

DESCRIPTION OF DRAWINGS

FIGS. 1B and 1C illustrate, respectively, a trap list and an instruction list used by the system of FIG. 1A.

DETAILED DESCRIPTION

It is possible to enhance or replace the content and/or functionality of a desired Internet resource by intercepting selected browser requests and redirecting those browser requests to resources that differ from the desired Internet resource. In one implementation, a proxy server is used to intercept browser requests, compare the intercepted browser requests against selected domain names, redirect browser requests that include selected domain names to a jump server other than the server containing the requested resource, and process those browser requests to provide content or functionality other than that of the destination resource. In another implementation, rather than using a proxy server, software is provided on a client computer to intercept selected browser requests and redirect those requests to the jump server. In yet another implementation, rather than using a jump server, software is provided on the proxy server for intercepting and processing browser requests to provide content or functionality that differs from the content and functionality provided by the destination resource.

In each of these implementations, the browser request may be redirected to a resource other than the destination resource, e.g., a server other than the destination server or a uniform resource locator (URL) other than the destination URL. The browser request may also be processed such that content is provided in addition to the content of the destination resource. For example, for selected browser requests, the display may be reconfigured to add one or more windows other than the window used to display content from the destination resource. These windows may overlay the window used to display content from the destination resource, or they may be arranged for display in addition to that window (e.g., windows positioned adjacent the window used to display content from the destination resource).

Figure 1A:
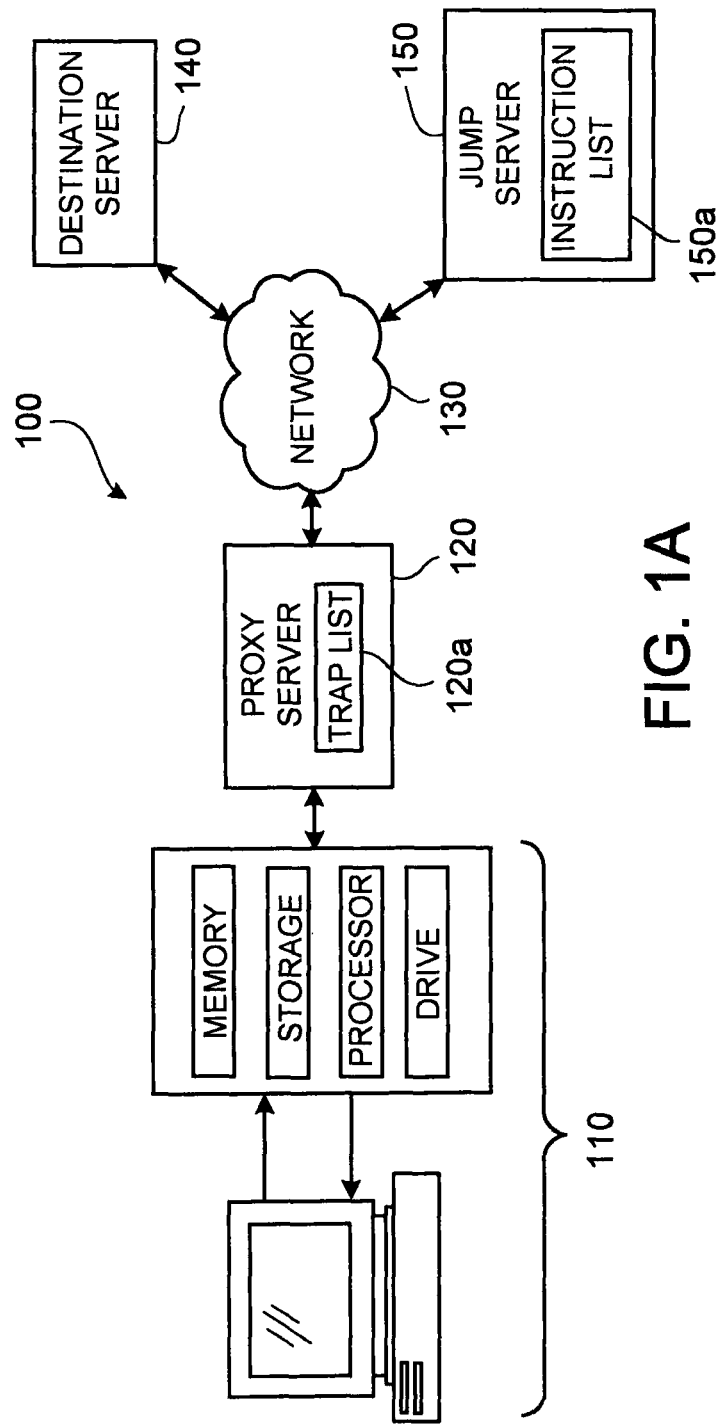
FIG. 1A is a block diagram of a system capable of processing filtered browser requests.

FIG. 1A shows a computer system 100 capable of filtering and processing browser requests. The system 100 includes a client computer 110, a proxy server 120, a network 130, a destination server 140, and a jump server 150.

Client computer 110 is typically implemented in a personal computer (PC), laptop computer, or workstation computer. Client computer 110 includes hardware and software that allows an operator to perform various tasks, such as communicating with other computers and their operators, accessing resources stored on the computer or other accessed computers, and viewing, creating, and manipulating electronic content (e.g., any combination of text, images, movies, music or other sound, animations 3D virtual worlds, and links to other objects). More specifically, client computer 110 includes various input/output (I/O) devices (e.g., mouse, keyboard, microphone, video input/output, touchscreen input, display and modem). Client computer 110 also generally includes a general or special purpose computer having a central processor unit (CPU), I/O ports and drivers, memory, and storage devices. Examples of memory devices include volatile and/or non-volatile devices such as flash memory, random access memory (RAM), read-only memory (ROM), programmable read-only memory (PROM), erasable PROMs, and electrically erasable PROMs. Examples of storage devices include floppy disk drives, compact disk (CD) drives, digital versatile disk (DVD) drives, permanent (hard) disk drives of magnetic and optical types, and tape or backup drives.

The storage of client computer 110 includes software for accessing an Internet service provider (ISP), which software enables communications with network resources over a modem or other telecommunications devices. The software includes a browser that is used by operators of the client computer 110 to generate requests for network resources accessed by the modem or telecommunications devices. Using browser software, client computer 110 is able to access the electronic content and resources stored locally within its own storage and memory, or the electronic content and resources stored on remote computers, which may represent client computers of other users or destination servers such as that shown by reference numeral 140.

Proxy server 120 is an intermediary that is positioned between client computer 110 and network resources (e.g., destination server 140 and jump server 150). Typically, an IP address for proxy server 120 is specified as a configuration option for the browser or other protocol program. Once this address is specified, communications between client computer 110 and network 130 are routed through proxy server 120. Proxy server 120 is invisible to the operator of client computer 110, as all network requests and returned responses appear to be directly sent or received from the addressed destination server. An example of a proxy server 120 includes Internet service provider (ISP) computers, where communications between client computer 110 and the Internet are routed through the ISP computers.

Proxy server 120 can be configured to provide security, administrative control, and caching services. Proxy server 120 may be associated with, or be part of, a gateway that separates an internal network of client computers 110 from external network 130, and may provide a firewall that protects the internal network from outside intrusion.

Figure 1B:
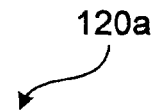

Proxy server 120 generally includes a cache of previously downloaded network resources (e.g., web pages). When a browser request from client computer 110 is received by proxy server 120, the proxy server filters each browser request against the cache of previously downloaded network resources. If a match exists between the browser request and a cached network resource, proxy server 120 is able to generate and return a response to client computer 110 without forwarding the browser request to network 130. Conversely, if the browser request does not match a cached network resource, proxy server 120 uses one of its own IP addresses to request the network resource from destination server 140 over network 130, with proxy server 120 acting as a client on behalf of client computer 110. When the requested network resource is returned to proxy server 120, that network resource is forwarded to client computer 110. In the implementation of FIG. 1A, proxy server 120 includes one or more trap lists 120a that are used for comparison against browser requests received from the browser software on client computer 110. FIG. 1B provides an example of a trap list 120a. This particular trap list 120a shows a list of domain names against which browser requests from client computer 110 are compared and with which browser requests including selected domain names (a "selected browser request") are identified. Trap list 120a also may include other criteria against which browser requests may be compared, such as, for example, uniform resource locators (URLs). Furthermore, as an alternative or complement to trap list(s) 120a, proxy server 120 may include other search and/or filtering criteria or algorithms used to identify selected browser requests. In any event, the proxy server 120 specifies one or more destinations for browser requests discriminated by the trap list 120a or other search and filtering criteria. Network 130 is positioned between client computer 110 and network resources at destination server 140 and enable electronic communications between them. Typically, network 130 includes an intranet, a local area network (LAN), a wide area network (WAN) such as the Intranet, or some combination of these components.

Destination server 140 is a computer that is electrically coupled with network 130 and stores selected resources (e.g., content and services) and provides client computers 110 access to those selected network resources in response to browser requests. Typically, a destination server 140 is identified by a domain name and is accessed in response to browser requests including that domain name. An example of a destination server 140 is a host computer that provides subscribers with online computer services such as e-mail, e-commerce, chat rooms, Internet access, and electronic newspapers and magazines. Users of services offered by a host computer typically communicate with one or more central servers through client software executing on their respective client computers 110.

Jump server 150 is a computer that is also connected to network 130. In the implementation shown in FIG. 1A, jump server 150 receives browser requests trapped by proxy server 120. Jump server 150 includes an instruction list 150a that associates trapped browser requests with processing instructions that differ from the processing instructions included at the destination server specified in the browser requests.

FIG. 1C provides an example of an instruction list 150a. This particular instruction list 150a specifies a series of domain names and related processing instructions. For example, the domain http://sportsmansguide.com is associated with three processing instructions: (1) {{ADP file}frameset.adp}—a file with instructions for splitting the display window before displaying content from sportsmansguide.com, (2) {{Real URL} http/www.sportsmansguide.com/?}—a command for displaying the destination server resource in a first of the split windows, and {enabled t} {title "Sportsman's Guide"}—a file for displaying a shopping bar in the second split window with the title "Sportsman's Guide." Other domains within the instruction list are generally associated with processing instructions that differ from the processing instructions specified for the www.sportsmansguide.com domain, although they may be the same as those instructions. In this manner, it is possible to use the instruction list to supplement the content of the destination resource.

Typically, proxy server 120, destination server 140, and/or jump server 150 will not be single monolithic entities. Rather, each will include several interconnected server computers to distribute load. Each interconnected server computer may be dedicated to performing independent or duplicative operations, and/or to particular geographic regions or characteristics.

Figure 2A:
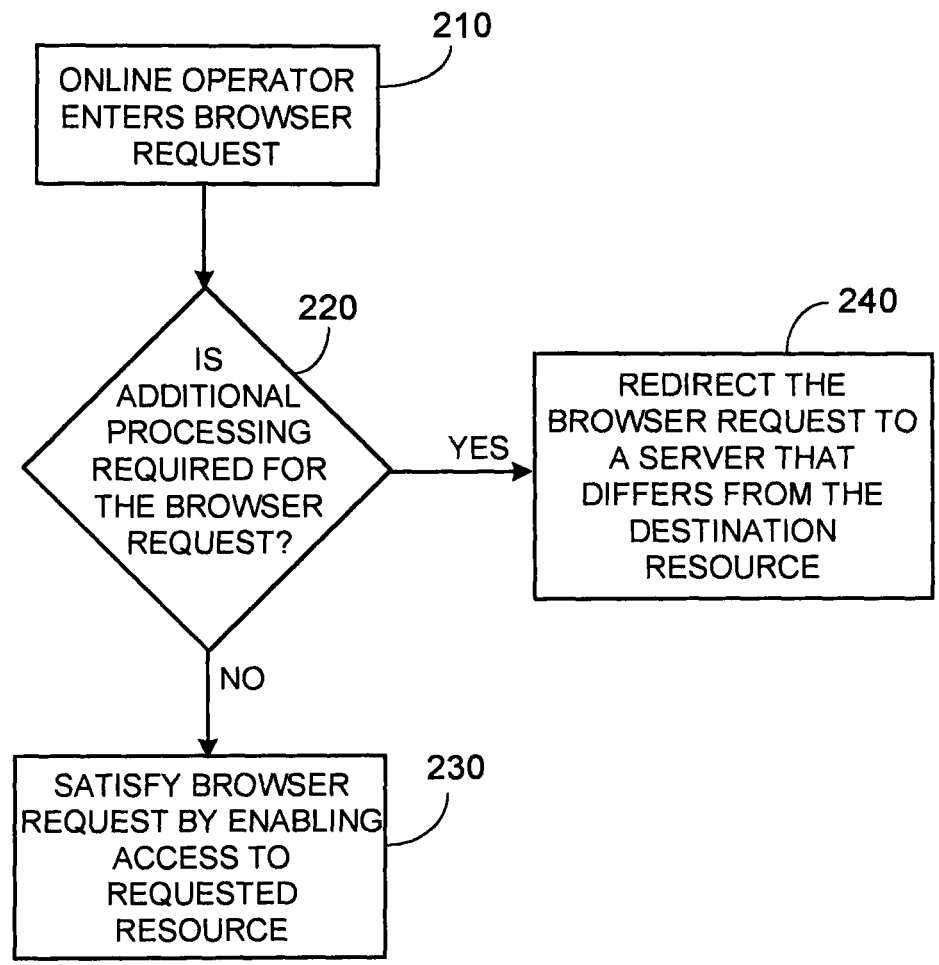
FIGS. 2A and 2B are flowcharts showing processes performed to process filtered browser requests.

FIG. 2A shows several steps used to process selected browser requests. In FIG. 2A, when an online operator enters a browser request (step 210), the browser request is filtered (step 220). Non-selected browser requests are routed to the destination resources specified by the browser requests (step 230) and selected browser requests are redirected to provide content or functionality other than that of the destination resource (step 240).

More specifically, online operators enter browser requests (step 210) using browser software stored and run by client computer 110. A typical browser request includes the domain name of a destination server upon which a resource is located. For example, a browser request for resources located on the destination server identified as www.jcrew.com may include that domain name. Furthermore, if specific resources are requested from particular html pages ("webpages") of the destination resource, the URL corresponding to those webpages may also be included in the browser request. An example of a browser request including a URL for a desired resource is www.jcrew.com/homepage.html.

Selected browser requests are then identified for additional processing using filtering techniques (step 220). For instance, in the implementations described with respect to FIGS. 1A and 3A, the browser requests are routed to proxy server 120. At the proxy server 120, the browser requests are compared against a trap list 120a that includes criteria such as domain names and/or URLs of selected resources. However, in other implementations, such as the one shown in FIG. 3B, the browser request may be compared to a trap list located at the client computer. In each of these implementations, other searching and filtering criteria may be used to identify selected browser requests. For example, domain extensions (.com, .gov, .edu) may be used as search/filtering criteria.

When a browser request is not identified for additional processing according to the filtering techniques (step 220), that browser request is routed to the specified destination resource to be processed in accordance with conventional methodologies (step 230). That is, when a browser request is not identified as a selected browser request, the destination server is accessed and the destination resource is downloaded without additional processing.

Conversely, when a browser request is selected for additional processing (step 220), the browser request is redirected to a jump server that is programmed to provide content and/or functionality other than that of the specified destination resource (step 240). For instance, FIG. 2B describes one implementation of step 240, where selected browser requests are re-routed from the destination server specified by the browser request (step 242), appropriate additional processing is identified for the browser requests (step 244), and the identified processing is performed with respect to each browser request (step 246).

More specifically, in step 242, selected browser requests are routed to one or more jump servers that differ from the destination servers specified by the browser requests. The jump servers are generally identified by trap lists or other filtering criteria used to discriminate the selected browser requests. Although the selected browser requests are typically routed to a single jump server or single bank of jump servers, it is also possible to route the selected browser requests to several different jump servers.

In step 244, instruction sets included on the jump server are used to identify processing appropriate for the selected browser requests. For instance, an example instruction list is shown by FIG. 1C and described above. By matching the browser request against the information in an instruction list on the destination jump server specified for the browser) request, a set of process instructions appropriate for the selected browser request may be identified.

In step 246, the instructions specified in the instruction list for the selected browser request are performed. Depending upon the instructions provided in the instruction list, it is possible to change the domain name of a destination server to a domain name that enables evaluation of browser activities with respect to goods or services associated with host of the domain server. For instance, if a browser request specifies www.jcrew.com, the browser request may be re-routed to www.jcrew.com/aol, which domain enables tracking of browser activities with respect to the JCREW website. Alternatively, it is possible to split a window and to display a toolbar or additional content (e.g., advertising) for domain names and URLs specified in selected browser requests.

For instance, as described with respect to the sample instruction provided in the example instruction list provided by FIG. 1C, the domain http://sportsmansguide.com is associated with three processing instructions. The first instructions {{ADP file}frameset.adp} split the display window before displaying content from sportsmansguide.com. The second instructions are commands for displaying the destination server resource in a first of the split windows, and the third instructions are commands for displaying a shopping bar in the second split window.

Figure 3A:
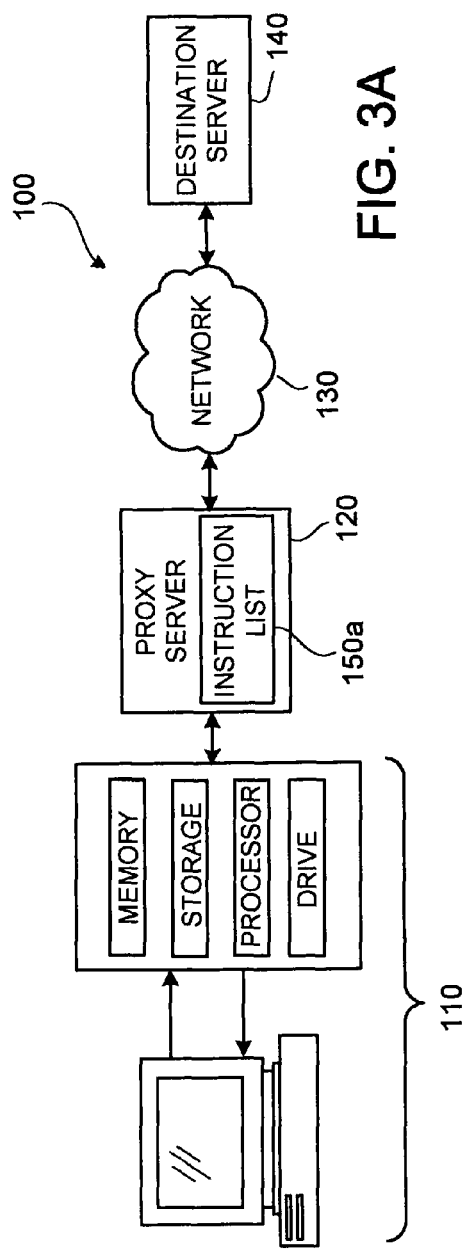
FIGS. 3A and 3B are block diagrams showing components within a system capable of processing filtered browser requests.
Figure 3B:
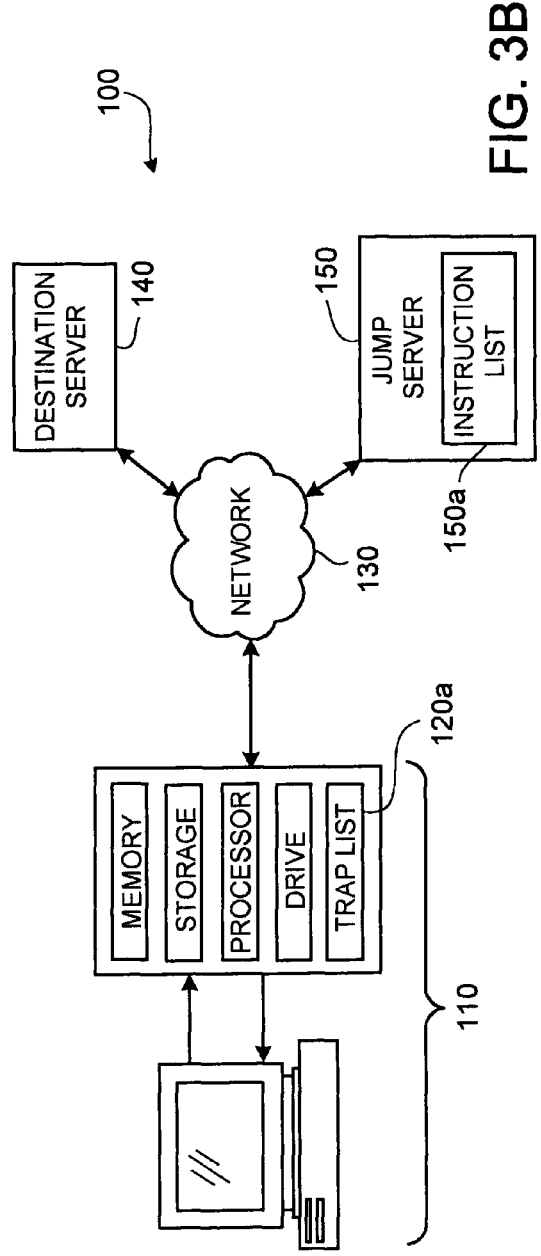

FIGS. 3A and 3B show components of alternative systems for processing filtered browser requests. The systems of FIGS. 3A and 3B operate similarly to the system 100, with differences noted below.

In the implementation of FIG. 3A, jump server 150 is eliminated for purposes of the described operations, and instruction list 150a is included on proxy server 120, replacing trap list 120a. With this configuration, browser requests received by proxy server 120 from client computer 110 are compared against instruction list 150a in a manner similar to the process of comparing received browser requests against trap list 120a described above in step 220 of FIG. 2A. Browser requests identifying selected network resources are then processed by proxy server 120 according to the processing performed by jump server 150 in the implementation of FIG. 1A, which is described above with respect to step 240 of FIG. 2A and steps 244 and 246 of FIG. 2B.

In the implementation of FIG. 3B, proxy server 120 is eliminated for purposes of the described filtering operations, and trap list 120a is stored at client computer 110. As such, browser requests are compared with the trap list 120a before being sent from client computer 110, and browser requests identifying selected network resources are re-routed by client computer 110 to jump server 150 for further processing.

The system and process described above find particular utility when applied to facilitate online shopping (also known as electronic commerce, or more familiarly e-commerce). Specifically, using the concepts described above, a toolbar enabling relevant shopping tools may be combined with merchant web pages. For the user, this combination enables one-click access to key tools and support information. By customizing the toolbar appearance, it is possible to use this technology to establish a consistent, universal appearance for users navigating e-commerce web sites.

Figure 2B:
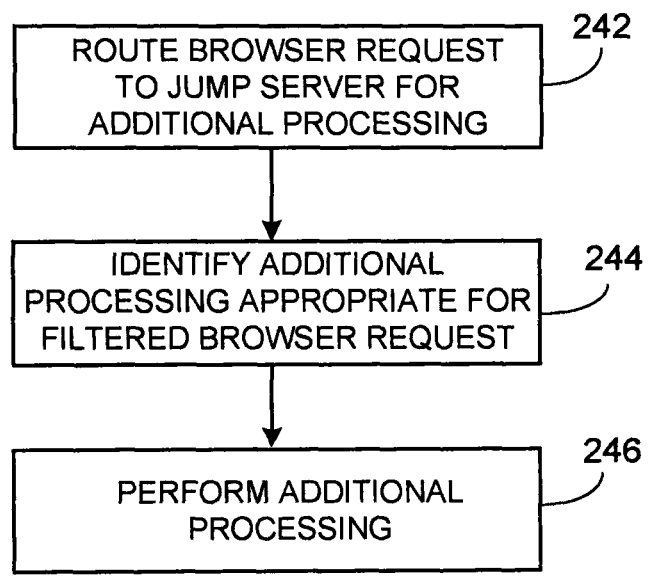

FIGS. 4A-4E illustrate examples of displays created by splitting windows and enhancing the content of destination servers and resources in the manner described with respect to FIGS. 2A and 2B.

Figure 4A:
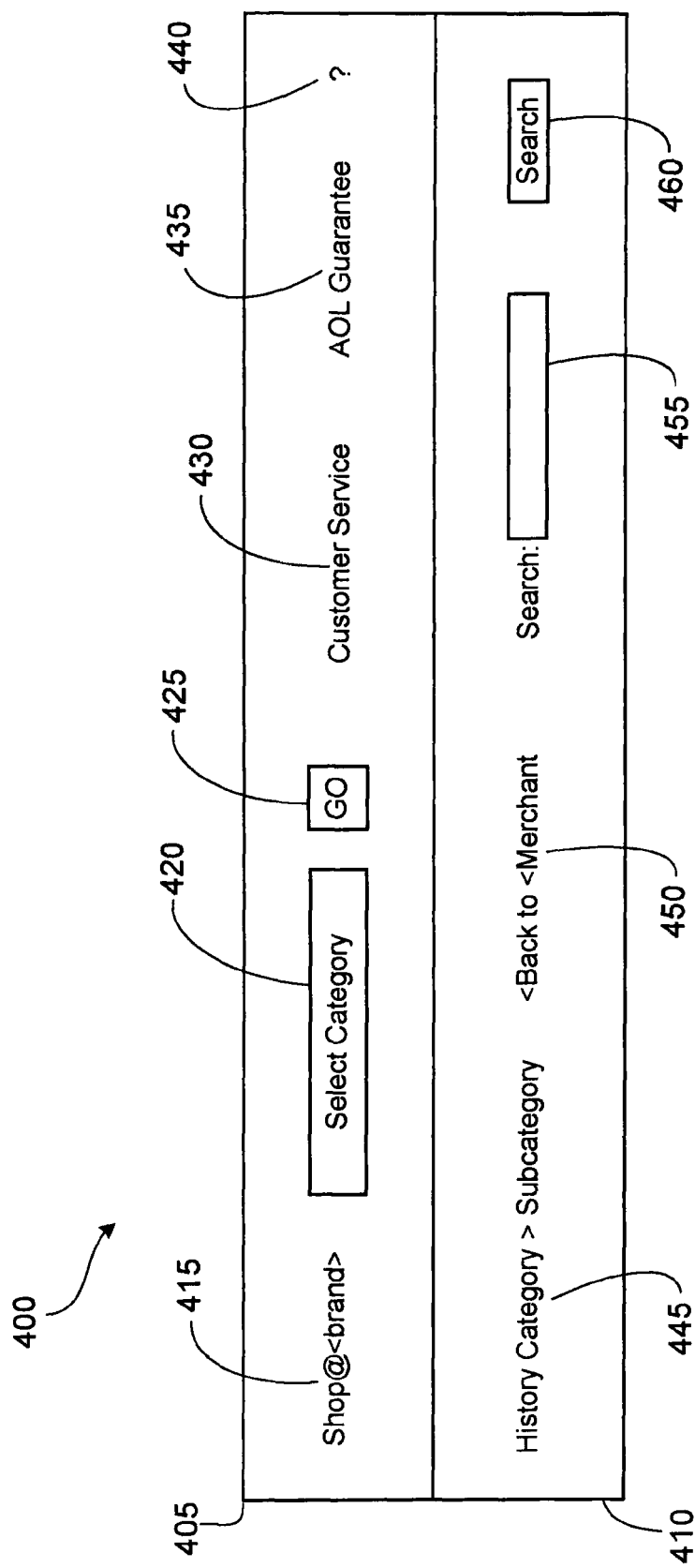
FIGS. 4A-4E are illustrations of views presented to online operators that submit filtered browser requests.

Referring to FIG. 4A, a representative toolbar layout illustrates one embodiment of a proxy-fed toolbar 400 that would appear as a banner in the upper portion of the computer screen as a horizontal strip that extends across the entire computer screen, from left to right. In a preferred implementation, the proxy-fed toolbar 400 consists of two segments: a "Universal" segment 405, which corresponds to the upper half of the toolbar, and a "Site" segment 410, which corresponds to the lower half of the toolbar.

The Universal segment 405 of the proxy-fed toolbar 400 contains several features. First, it displays the brand name of the online service provider, for example, the "Shop@AOL" brand 415. The brand image links to the main web page of that brand's shopping main page.

The Universal segment 405 of the toolbar 400 also contains a single-selection drop-down menu 420 containing some or all shopping categories, listed in alphabetical order. Exemplary shopping categories include the following: Apparel, Arts and Collectibles, Auctions & Outlets, Auto Center, Computing Center, Consumer Electronics, Entertainment, Food and Gourmet, Gift Center, Health and Beauty, Home and Garden, Home Office & Business, Jewelry & Accessories, Kids, Pet Center, and Sports & Outdoor.

The Universal segment of the toolbar contains a "Go" button 425. When a user clicks on the "Go" button X25, a new browser request is entered to again invoke the above described processes.

The Universal segment of the toolbar contains a "Customer Service" link 430. When a user clicks on the "Customer Service" button 430, an electronic link to a menu web page is activated. The Customer Service web page provides a user with several options designed to address typical customer concerns.

The Universal segment of the toolbar contains an "AOL Guarantee" link 435. When a user clicks on the "AOL Guarantee" button 435, an electronic link to a web page containing a guarantee is displayed that is designed to provide the customer with protection in the event of unfair treatment by a merchant.

The Universal segment of the toolbar contains a "Buying Guides" link 440. The Buying Guides link 440 is shown as a question mark ("?") on the toolbar. When a user clicks on the Buying Guides link 440, an electronic link to a web page designed to assist the user with navigating through the web site and to find appropriate merchants for the shopping needs of the user is activated.

In another embodiment, the toolbar contains a "Quick Checkout" link. The Quick Checkout link is designed to accelerate the process of transacting business. Further details on the Quick Checkout link are described in provisional application No. 60/160,874 filed Oct. 22, 1999 and the utility application filed concurrently with this application, which is titled "Sharing the Personal Information of a Network User With Resources Accessed By That Network User." Both of these applications are incorporated by reference in their entirety.

The site segment of the toolbar contains a "Department History" link 445. When a user clicks on the Department History link, a menu containing the shopping categories (see the shopping category drop-down menu option 420, described above) appears, and the user can select which shopping category is of interest. After the user selects a category, a display appears showing which merchants within that category have been previously accessed by the user in reverse chronological order. Each item in the display is a hyperlink to the merchant's web site. The Department History link 445 is thus intended to assist the user by recognizing that shoppers often will patronize merchants that they have patronized before.

The Site segment of the toolbar contains a "Back to <Merchant>" link 450. The Back to Merchant link 450 enables a user to quickly return to the most recently visited merchant site, by clicking on the link.

The Site segment of the toolbar contains a Search interface, including an input box 455 and a "Search" button 460. The Search input box 455 can accept strings of at least a pre-defined number (e.g., 30) characters. After a user enters a string into the input box 455, the user then clicks on the Search button 460, and a keyword search is performed upon the merchant web sites that are accessible via the toolbar. In this manner, a customer can easily search for an item of interest.

Figure 4B:
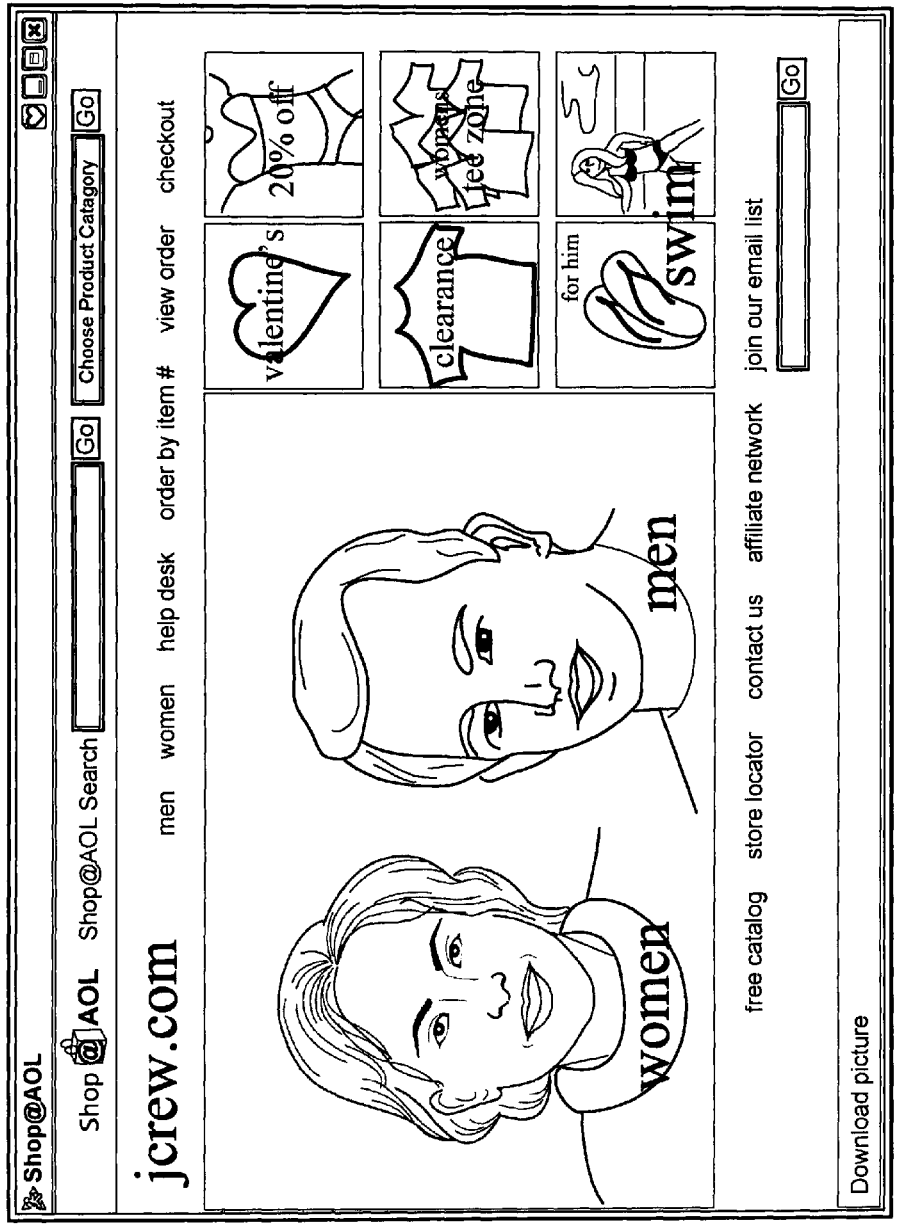
Figure 4C:
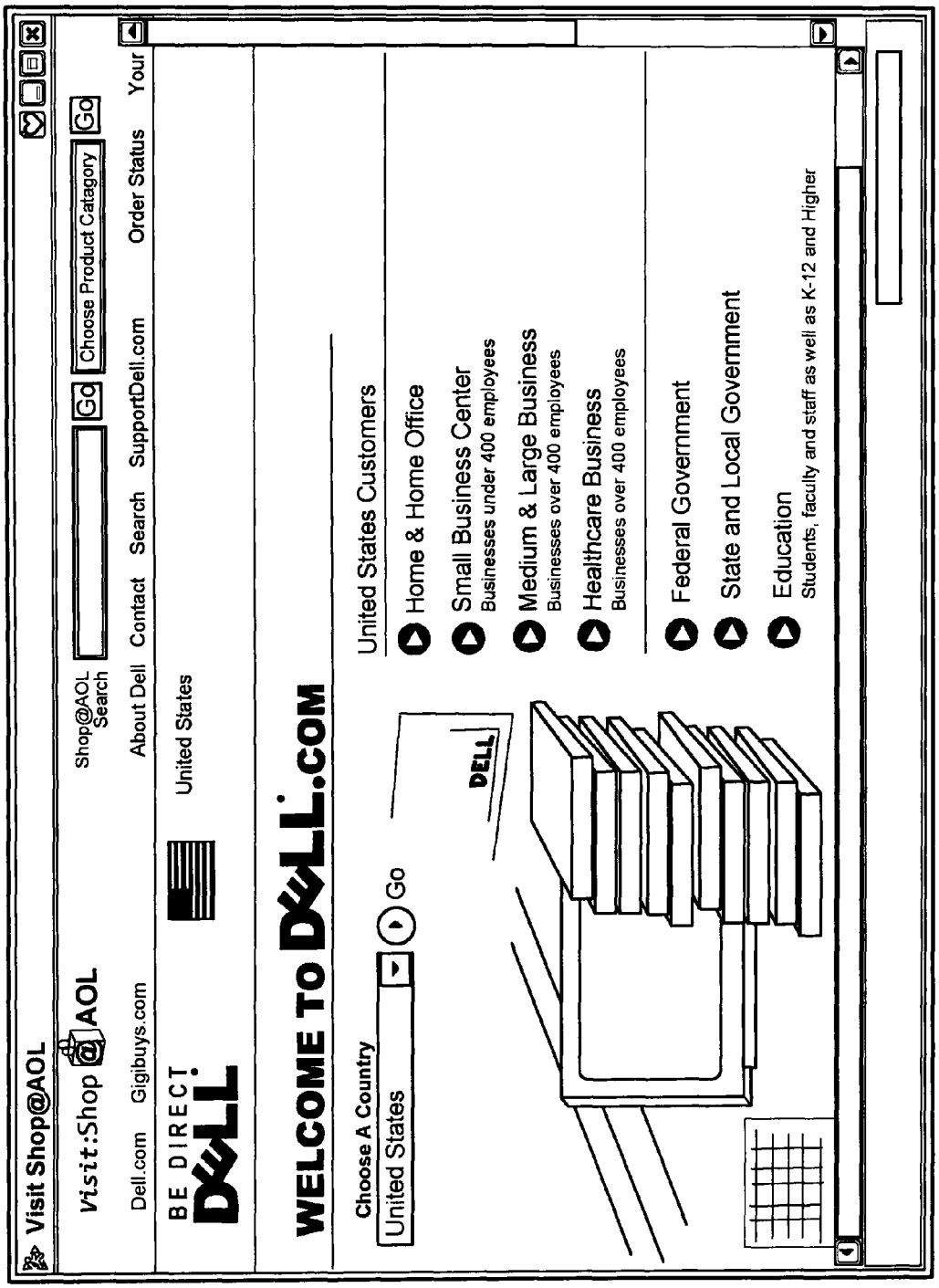

FIG. 4B illustrates a window displayed in response to a browser request for www.jcrew.com, where the destination server is displayed on only a portion of the screen. In the FIG. 4B example, the window is split into an upper window and a lower window. While the destination server is accessed and appropriate contents from the destination server are displayed in one of the windows (lower), a toolbar is formed in the upper window to enable improved functionality. The content of the toolbar may vary site-to-site based on various criteria. For instance, the toolbars of FIGS. 4B and 4C differ slightly, FIG. 4B generally corresponding to member or affiliate web sites and FIG. 4C generally corresponding to non-member web sites.

Figure 4D:
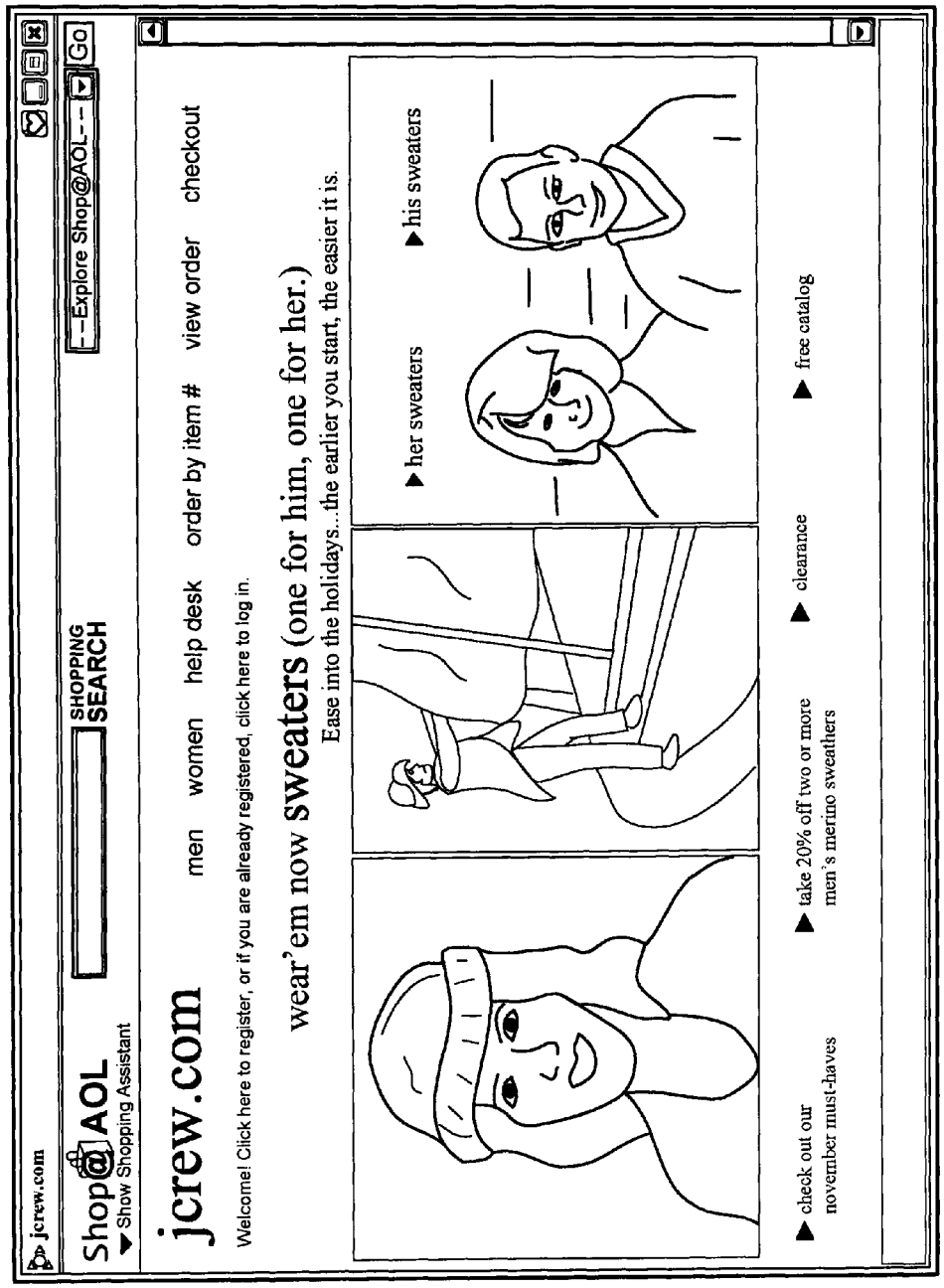
Figure 4E:
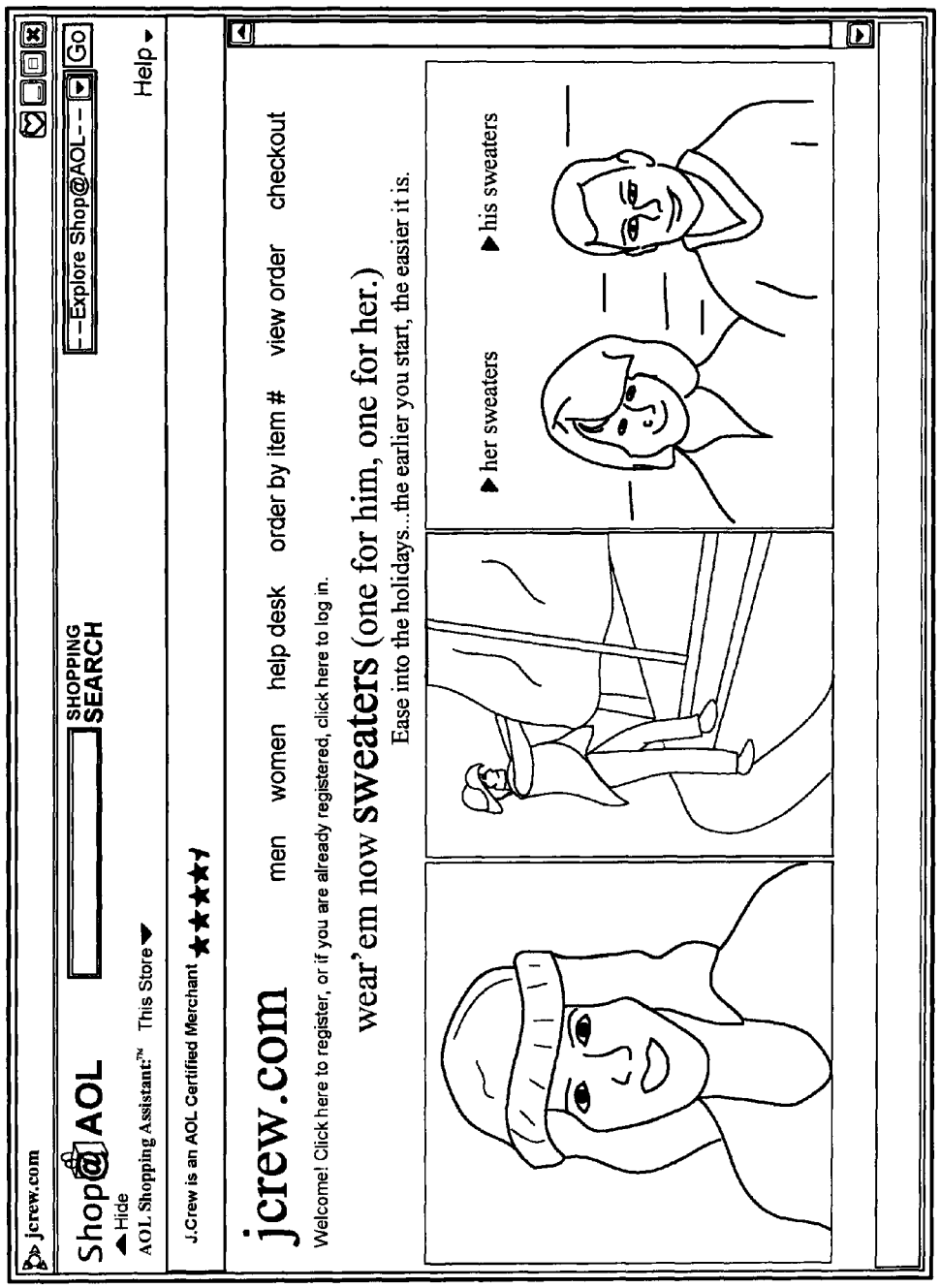

Similarly, FIGS. 4D and 4E are used to illustrate additional content that may be delivered based on the identification of selected destination servers. In FIG. 4D, a toolbar similar to that of FIG. 4B is provided. However, in FIG. 4E, a toolbar is enhanced with a rating for services and content provided by the domain specified by the browser. This additional content may be immediately apparent during the initial rendering of the display, or it may be added to the display in the form of an update. In this manner, processing may be performed to identify or determine the information to be supplementally displayed without delaying the display expected by the user, and without requiring the display to completely refresh when the supplemental information becomes available.

A number of embodiments have been described. Nevertheless, it will be understood that various modifications may be made. For example, other toolbars may contain additional features. Accordingly, other embodiments are within the scope of the following claims.

What is claimed is:

1. A method comprising:
processing a browser request, wherein the browser request specifies a destination network resource;
modifying, using at least one processor, the browser request to enable evaluation of web browsing activities, wherein modifying the browser request comprises referring to an instruction list and executing one or more instructions specified by the instruction list to modify the browser request; and
tracking the web browsing activities of a client based on the modified browser request.

2. The method of claim 1, wherein the instruction list specifies a series of domain names and related processing instructions.

3. The method of claim 2, further comprising determining a domain associated with the destination network resource.

4. The method of claim 3, wherein executing one or more instructions specified in the instruction list to modify the browser request further comprises:
locating the associated domain in the series of domains; and
executing the related processing instructions for the associated domain.

5. The method of claim 1, wherein modifying, using at least one processor, the browser request to enable evaluation of web browsing activities comprises changing a domain name included in the browser request to a different domain name that enables evaluation of browser activities.

6. The method of claim 5, wherein the different domain name enables tracking of browser activities with respect to a specified website.

7. A computer program product for use at a computer system, the computer program product comprising one or more non-transitory computer readable storage media having stored thereon computer-executable instructions that, when executed at a processor, cause the computer system to:
process a browser request, wherein the browser request specifies a destination network resource;
modify the browser request to enable evaluation of web browsing activities, wherein modifying the browser request comprises referring to an instruction list and executing one or more instructions specified by the instruction list to modify the browser request; and
track the web browsing activities of client based on the modified browser request.

8. The computer program product of claim 7, wherein the instruction list specifies a series of domain names and related processing instructions.

9. The computer program product of claim 8, further comprising computer-executable instructions that, when executed, cause the computer system to determine a domain associated with the destination network resource.

10. The computer program product of claim 9, further comprising computer-executable instructions that, when executed, cause the computer system to:
locate the associated domain in the series of domains; and
execute the related processing instructions for the associated domain.

11. The computer program product of claim 7, wherein computer-executable instructions that, when executed, cause the computer system to modify the browser request to enable evaluation of web browsing activities comprise computer-executable instructions that, when executed, cause the computer system to change a domain name included in the browser request to a different domain name that enables evaluation of browser activities.

12. The computer program product of claim 7, wherein the different domain name enables tracking of browser activities with respect to a specified website.

13. The computer program product of claim 7, wherein the computer system is selected from among: a proxy server and a jump server.

14. A method comprising:
processing a browser request, wherein the browser request specifies a domain for a destination website;
modifying the browser request, using at least one processor, to reroute the browser request to a different domain that enables evaluation of web browsing activities;
using filtering techniques to identify the browser request for additional processing prior to modifying the browser request; and
tracking the web browsing activities of a client based on the modified browser request.

15. The method of claim 14, wherein processing a browser request comprises processing a web browser request sent from a web browser.

16. The method of claim 14, wherein modifying the browser request, using at least one processor, to reroute the browser request to the different domain further comprises:
matching the browser request against information in the instruction list to identify a set of instructions appropriate for the browser request; and
performing one or more instructions included in the set of instructions to change the domain to the different domain in the browser request.

17. The method of claim 14, wherein modifying the browser request, using at least one processor, to reroute the browser request to different domain comprises rerouting the browser request to a domain that enables tracking browser activities for the destination web site.

18. The method of claim 14, wherein processing the browser request comprises processing a browser request that includes a Uniform Resource Locator (URL).

19. The method of claim 14, wherein using filtering techniques to identify the browser request for additional processing comprises using filtering criteria to identify the browser request for additional processing, the filtering criteria including domain extensions.

* * * * *